United States Patent
Knauf et al.

(10) Patent No.: US 9,598,039 B2
(45) Date of Patent: Mar. 21, 2017

(54) INSTRUMENT PANEL FOR A VEHICLE

(71) Applicant: Volkswagen Aktiengesellschaft, Wolfsburg (DE)

(72) Inventors: Ronny Knauf, Beendorf (DE); Thomas Rehmke, Wesendorf (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/996,938

(22) Filed: Jan. 15, 2016

(65) Prior Publication Data
US 2016/0129871 A1    May 12, 2016

Related U.S. Application Data

(63) Continuation of application No. PCT/EP2014/062732, filed on Jun. 17, 2014.

(30) Foreign Application Priority Data

Jul. 15, 2013   (DE) ........................ 10 2013 213 791

(51) Int. Cl.
*B60R 21/205* (2011.01)
*B60R 7/06* (2006.01)
(Continued)

(52) U.S. Cl.
CPC ....... *B60R 21/205* (2013.01); *B60H 1/00564* (2013.01); *B60K 35/00* (2013.01);
(Continued)

(58) Field of Classification Search
CPC ..... B60R 21/205; B60R 13/0256; B60R 7/06; B60R 11/0205; B60K 37/02; B60K 37/04;
(Continued)

(56) References Cited

U.S. PATENT DOCUMENTS 5,085,465 A * 2/1992 Hieahim ................ B60R 21/30
                                                              280/738
5,088,765 A * 2/1992 Hirashima ............ B60R 21/205
                                                              180/90
(Continued)

FOREIGN PATENT DOCUMENTS

CN      101985297 A     3/2011
CN      103038103 A     4/2013
(Continued)

OTHER PUBLICATIONS

Chinese Office Action for Chinese Application No. 201480046662.0 dated Dec. 2, 2016 with English translation.
(Continued)

*Primary Examiner* — Laura Freedman
(74) *Attorney, Agent, or Firm* — Muncy, Geissler, Olds & Lowe, P.C.

(57) ABSTRACT

An instrument panel for a vehicle, having an instrument panel upper part and a frame-like basic body, which can be mounted on a transverse mounting bar of the vehicle body, which basic body has receptacles for equipping with functional elements, for example radio, glove box, etc., and delimits at least one air channel of a vehicle ventilation system, in particular a defrost channel extending in the transverse direction of the vehicle along the windshield, wherein on the passenger side of the instrument panel an airbag arrangement is integrated which has a firing channel reaching to the instrument panel upper part and an airbag module mounted on a firing channel wall. According to the invention the basic body has at least one supporting section on which the firing channel wall is supported.

11 Claims, 4 Drawing Sheets

(51) Int. Cl.
  *B60R 11/02* (2006.01)
  *B60K 37/02* (2006.01)
  *B60K 37/04* (2006.01)
  *B62D 25/14* (2006.01)
  *B60R 13/02* (2006.01)
  *B60K 35/00* (2006.01)
  *B60H 1/00* (2006.01)
  *B60R 21/00* (2006.01)

(52) U.S. Cl.
  CPC ............. *B60K 37/02* (2013.01); *B60K 37/04* (2013.01); *B60R 7/06* (2013.01); *B60R 11/0205* (2013.01); *B60R 13/0256* (2013.01); *B60K 2350/401* (2013.01); *B60R 2021/0032* (2013.01)

(58) Field of Classification Search
  CPC  B60K 2350/401; B62D 25/14; B62D 25/142; B62D 25/145; B60H 1/00564
  See application file for complete search history.

(56) References Cited

U.S. PATENT DOCUMENTS

| | | | | |
|---|---|---|---|---|
| 5,135,253 A * | 8/1992 | Hirashima | ......... | B60R 21/2155 280/732 |
| 5,149,127 A * | 9/1992 | Manabe | ................. | B60R 21/01 280/731 |
| 5,150,919 A * | 9/1992 | Sakakida | .............. | B60R 21/216 280/732 |
| 5,190,314 A * | 3/1993 | Takasugi | ................... | B60R 7/06 280/730.1 |
| 5,209,519 A * | 5/1993 | Shiga | .................. | B60R 21/2171 280/728.2 |
| 5,230,530 A * | 7/1993 | Iriyama | ................ | B60R 21/205 280/732 |
| 5,295,708 A * | 3/1994 | Siga | ...................... | B60R 21/205 280/732 |
| 5,393,088 A * | 2/1995 | Bauer | ................ | B60R 21/2165 280/728.2 |
| 5,678,877 A * | 10/1997 | Nishijima | ........... | B60H 1/0055 180/90 |
| 5,904,367 A * | 5/1999 | Warnez | ................ | B60R 21/205 280/728.3 |
| 6,299,198 B1 * | 10/2001 | Nakashima | ........... | B60R 21/205 280/728.2 |
| 6,305,733 B1 * | 10/2001 | Rahmstorf | .......... | B62D 25/142 180/90 |
| 6,409,590 B1 * | 6/2002 | Suzuki | ................ | B60H 1/0055 296/70 |
| 6,464,280 B1 | 10/2002 | Shibata et al. | | |
| 6,877,766 B2 * | 4/2005 | Mikolajewski | ....... | B60R 21/045 280/728.2 |
| 6,983,954 B2 * | 1/2006 | Sakaguchi | ............ | B60R 21/205 280/728.2 |
| 7,175,195 B2 * | 2/2007 | Morita | .................. | B60R 21/206 280/730.1 |
| 7,370,879 B2 * | 5/2008 | Hotta | .................... | B60R 21/206 280/728.2 |
| 7,722,077 B2 * | 5/2010 | Dietze | ................. | B60H 1/0055 280/728.2 |
| 7,878,532 B2 * | 2/2011 | Sasaki | ....................... | B60R 7/06 280/728.2 |
| 8,820,778 B2 | 9/2014 | Fukawatase | | |
| 2003/0085555 A1 * | 5/2003 | Segura | ............... | B29C 45/0081 280/728.3 |
| 2003/0222436 A1 * | 12/2003 | Charbonnel | ......... | B60H 1/0055 280/728.2 |
| 2004/0061262 A1 * | 4/2004 | Cowelchuk | ........... | B26D 3/085 264/442 |
| 2006/0186650 A1 * | 8/2006 | Kuwano | .............. | B60H 1/0055 280/732 |
| 2007/0235987 A1 | 10/2007 | Boggess et al. | | |
| 2008/0007032 A1 * | 1/2008 | Sadek | ................... | B60R 21/205 280/728.3 |
| 2008/0018081 A1 | 1/2008 | Yang et al. | | |

FOREIGN PATENT DOCUMENTS

| | | |
|---|---|---|
| DE | 196 18 817 A1 | 11/1997 |
| DE | 199 58 865 A1 | 6/2001 |
| DE | 101 08 685 C1 | 4/2002 |
| DE | 100 62 151 A1 | 6/2002 |
| DE | 103 00 035 A1 | 4/2004 |
| DE | 103 60 584 A1 | 7/2005 |
| DE | 10 2004 061 158 A1 | 6/2006 |
| DE | 60 2004 006 705 T2 | 1/2008 |
| DE | 10 2009 058 688 A1 | 6/2011 |
| DE | 10 2009 058 704 A1 | 6/2011 |
| DE | 10 2010 012 136 A1 | 9/2011 |
| DE | 10 2010 016 748 A1 | 11/2011 |
| DE | 10 2011 108 921 A1 | 1/2013 |
| EP | 0 646 501 B1 | 7/1998 |
| EP | 1 350 662 A1 | 3/2002 |
| EP | 1 493 634 A1 | 1/2005 |
| JP | 2000-272377 A | 10/2000 |
| JP | 2009-298357 | 12/2009 |
| JP | 2011140284 A * | 7/2011 |
| WO | WO 03/033314 A1 | 4/2003 |
| WO | WO 2010/060605 A1 | 6/2010 |

OTHER PUBLICATIONS

Korean Office Action for Korean Application No. 519990007539 dated Dec. 20, 2016 with English translation.

* cited by examiner

FIG. 2 Section I-I

FIG. 3 Section III-III

INSTRUMENT PANEL FOR A VEHICLE

This nonprovisional application is a continuation of International Application No. PCT/EP2014/062732, which was filed on Jun. 17, 2014, and which claims priority to German Patent Application No. 10 2013 213 791.5, which was filed in Germany on Jul. 15, 2013, and which are both herein incorporated by reference.

BACKGROUND OF THE INVENTION

Field of the Invention

The invention relates to an instrument panel for a vehicle.

Description of the Background Art

An an instrument panel is typically mounted on a transverse mounting bar which extends in a transverse direction of a vehicle between opposing A-pillar gussets of a vehicle body.

From DE 10 2009 058 688 A1, which is incorporated herein by reference, a class-specific instrument panel for a vehicle is known. This has an instrument panel upper part, having an airbag assembly integrated on the passenger side. The airbag assembly has a frame-shaped firing channel wall delimiting the firing channel. The firing channel is covered by an airbag cover on its airbag exit side. At the opposing side, an airbag module is mounted which among other things can comprise the airbag and a gas generator. The firing channel wall with the attached airbag module is molded at the bottom side of the instrument panel upper part.

In DE 10 2009 058 688 A1, the firing channel wall is supported via a fixing tab on the transverse mounting bar. In this way, the weight force of the airbag assembly is not supported solely by the instrument panel upper part, but is also carried by the transverse mounting bar.

In the conventional art, when temperatures in a vehicle are high, in particular in hot climates, without additional support on the transverse mounting bar there is a danger of material flow in the upper part of the instrument panel, causing the contour of the firing channel wall to appear on the display of the instrument panel. Also, attaching the assembly to the transverse mounting bar helps prevent an operational unfolding of the airbag assembly up into the resonance range.

Also, supplying the abovementioned mounting tab for support of the airbag assembly on the transverse mounting bar is coupled with an increase in the component weight as well as an increased component cost.

SUMMARY OF THE INVENTION

It is therefore an object of the invention to provide an instrument panel for a vehicle in which the airbag assembly is reliably and simply integrated in the instrument panel with a reduction in components.

The invention is based on the fact that customarily, the instrument panel upper part has as its substructure a frame-like basic body, as it is known from the example in DE 100 62 151 A1, which is incorporated herein by reference. The basic body is mounted on the transverse mounting bar of the vehicle body and has receptacles for equipping with functional elements, for instance a radio, glove box, etc. In addition, the basic body delimits at least one air channel of a vehicle ventilation system, in particular a defrost channel extending in the transverse direction of the vehicle along the windshield.

In the conventional art, the frame-like basic body is out of contact with the firing channel wall of the passenger side airbag assembly and is thus not used to support the component weight of the airbag assembly. In an embodiment of the invention, the basic body additionally has at least one supporting section which can support the firing channel wall. According to an embodiment of the invention, the support function is thus not provided by a support or fixing tab, but rather by the basic body itself as a result of the omission of such a support tab.

The invention is specifically advantageous in respect of the following material composition of the instrument panel: the instrument panel upper part can, for example, be an injection-molded component in which the firing channel wall and the airbag cover are integrally formed of the same material. This results in an extremely complex component geometry of the instrument panel upper part in which, for example, molding the abovementioned support tabs at the firing channel wall proves very difficult. According to the invention, instead of such molding of the support tab at the firing channel, the support function is provided by the already installed basic body.

In an embodiment, the instrument panel upper part can be a dimensionally stable foam carrier with a foam layer arranged thereon, and a decorative skin on the visible side. Such a multilayer structure is produced by an essentially familiar foaming process in which a foam carrier and a decorative skin are back-injected with the foam layer.

In an embodiment, the firing channel wall can be brought into contact with a first supporting section of the basic body in a loose, in particular vibration free manner, in particular with a linear contact.

The airbag module can be disposed in the channel cross section of the firing channel wall. For holding the airbag module, the firing channel wall can merge at its end facing away from the instrument panel upper part into at least one outwardly angled mounting leg. A housing flange of the airbag module can be fastened to the mounting leg of the firing channel wall, for example, as a threaded connection, i.e., threaded to the bottom of the mounting leg of the firing channel wall. Each of the side walls of the firing channel pointing in the transverse direction of the vehicle can each have two screw points which are spaced apart from one another in the longitudinal direction of the vehicle. Approximately centered between the screw points of each firing channel side wall, in each case a basic body supporting section, for example, a basic body flange, can be clamped.

In an embodiment, the basic body supporting section can be designed as a basic body flange. The abovementioned firing channel mounting leg can be supported on it in an exemplary manner. To ensure a reliable connection, the basic body flange can be clamped between the firing channel mounting leg and the housing flange of the airbag module by forming a three-layer structure.

The support tab used in the prior art is usually attached to the center of the front side of the firing channel wall, relative to the driving direction. In contrast, to achieve reliable and vibration-free fastening it is preferable when the basic body does not only have a supporting section but several supporting sections spaced apart from one another. This results in a support base as wide as possible for the airbag assembly. A first supporting section of the basic body can be positioned in front of the airbag module in driving direction, which supports the front firing channel wall. In addition, a second and a third supporting section can be provided which are each positioned laterally at the airbag module as seen from the transverse direction of the vehicle and which each support the lateral firing channel walls.

As mentioned above, the instrument panel upper part can be an injection-molded component with the possibly integrally formed airbag cover and the integrally formed firing channel wall. In this case, a plastic melt, for example polypropylene, is injected under pressure and heat into an injection mold chamber of a molding tool to produce the instrument panel upper part, which replicates the negative mold of the instrument panel upper part. The injection mold chamber can be commonly delimited by tool components which can be moved apart in a demolding direction after molding and cooling has taken place.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
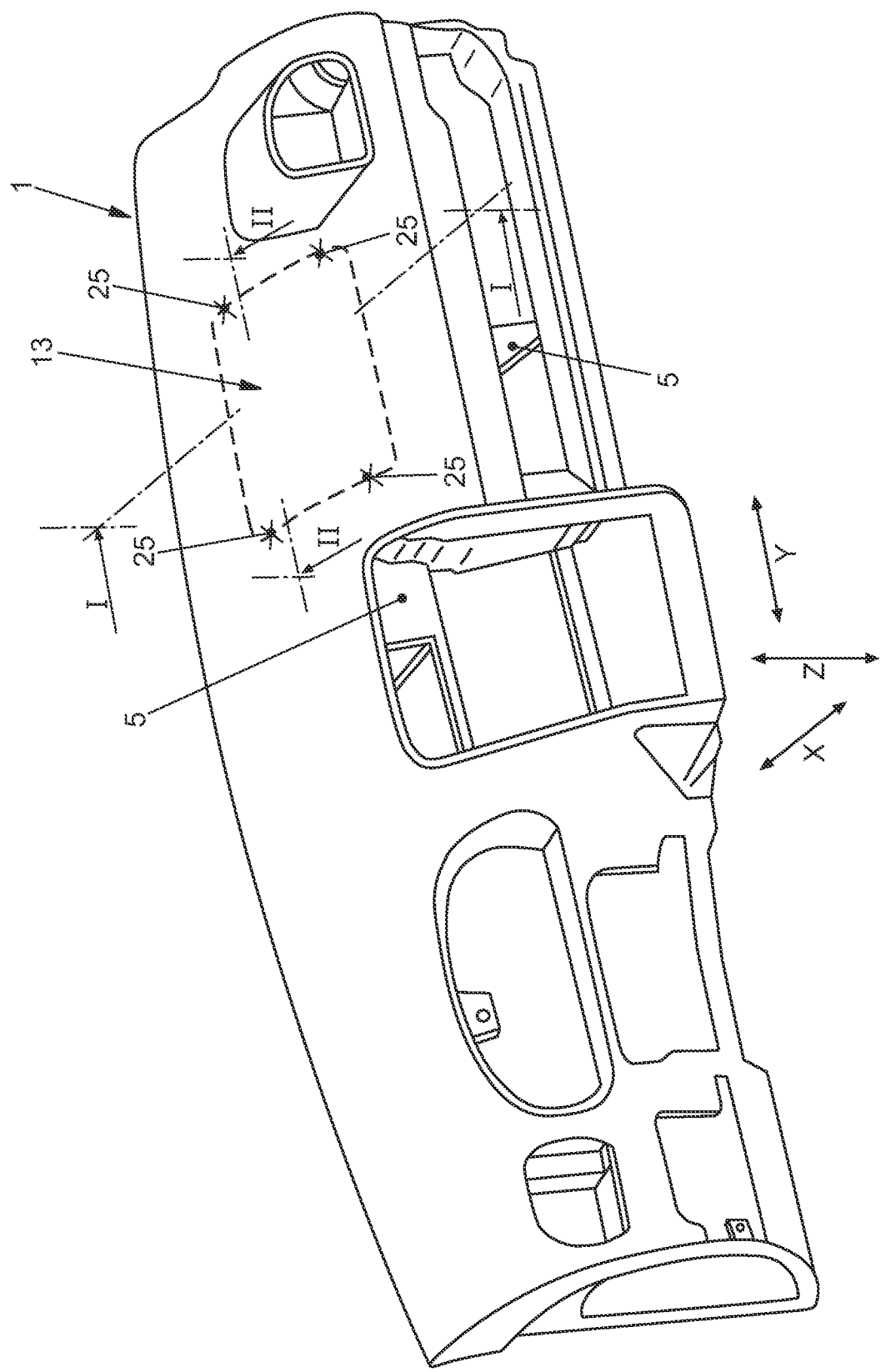
FIG. 1 illustrates an instrument panel for a vehicle in a perspective, unique position.

FIG. 1 shows an instrument panel 1 in a perspective, unique view without the equipped functional elements, that is, without the speedometer, air vent, glove box, radio or similar. In the assembled state, the instrument panel 1 is mounted on a transverse mounting bar 3 (FIG. 2) which extends between the upper A-pillar node of a vehicle body.

Figure 2:
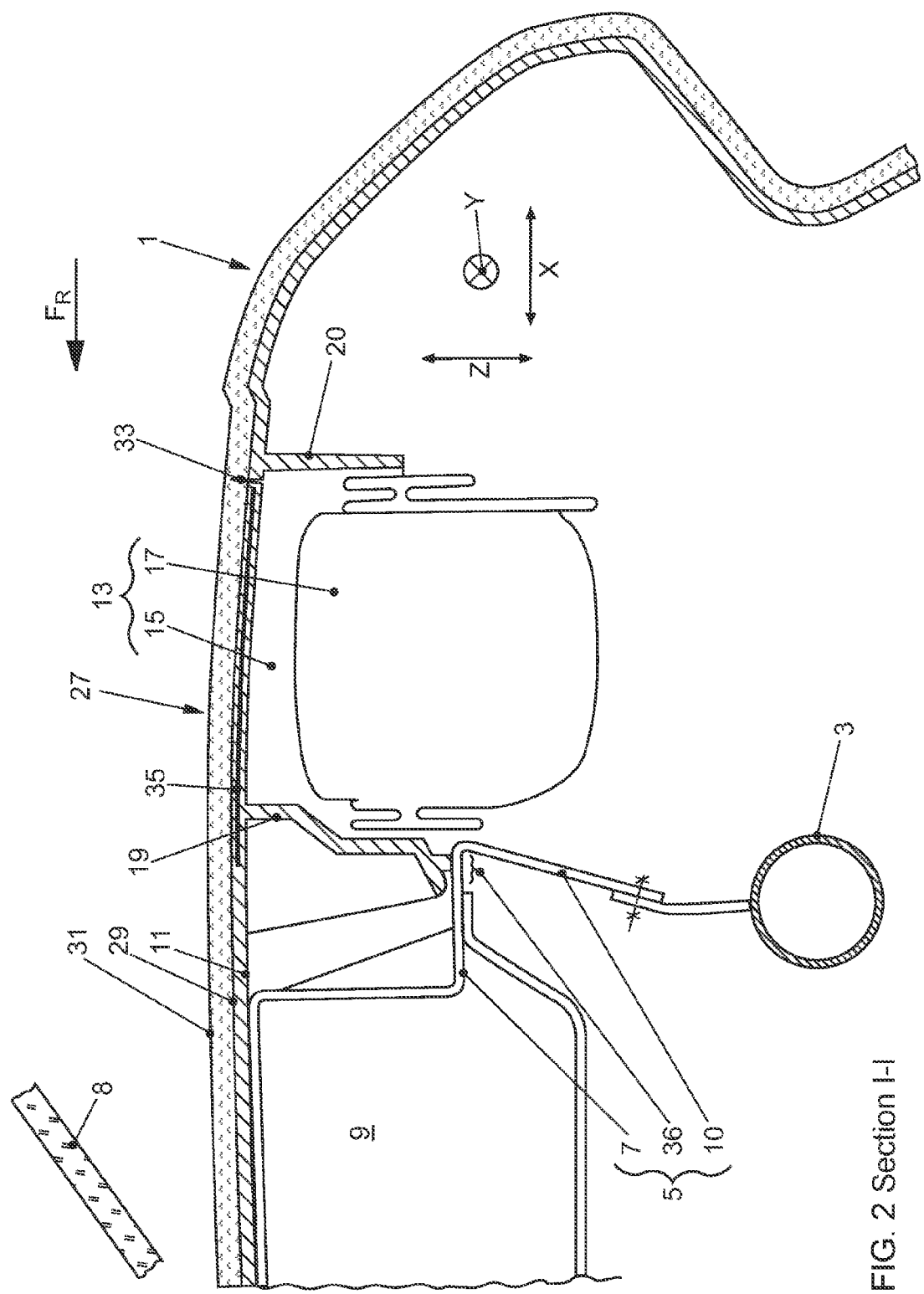
FIG. 2 illustrates an enlarged partial, cross-sectional view along the section plane I-I from FIG. 1.

FIG. 2 shows an assembled state in which the instrument panel 1 is mounted above a frame-like basic body 5 on the transverse mounting bar 3. The basic body 5 has among other things receptacles for the abovementioned functional elements of the instrument panel 1. In addition, the basic body 5 defines air channels of the vehicle ventilation system with delimiting walls 7, that is, in an exemplary manner in FIG. 2, a defrost channel 9 running in the transverse direction of the vehicle y along the windshield 8. This channel is delimited by the delimiting wall 7 and an instrument panel upper part 11 on the visible side. The instrument panel upper part 11 forms the visible side of the instrument panel 1 and shields the basic body 5 from view.

Figure 3:
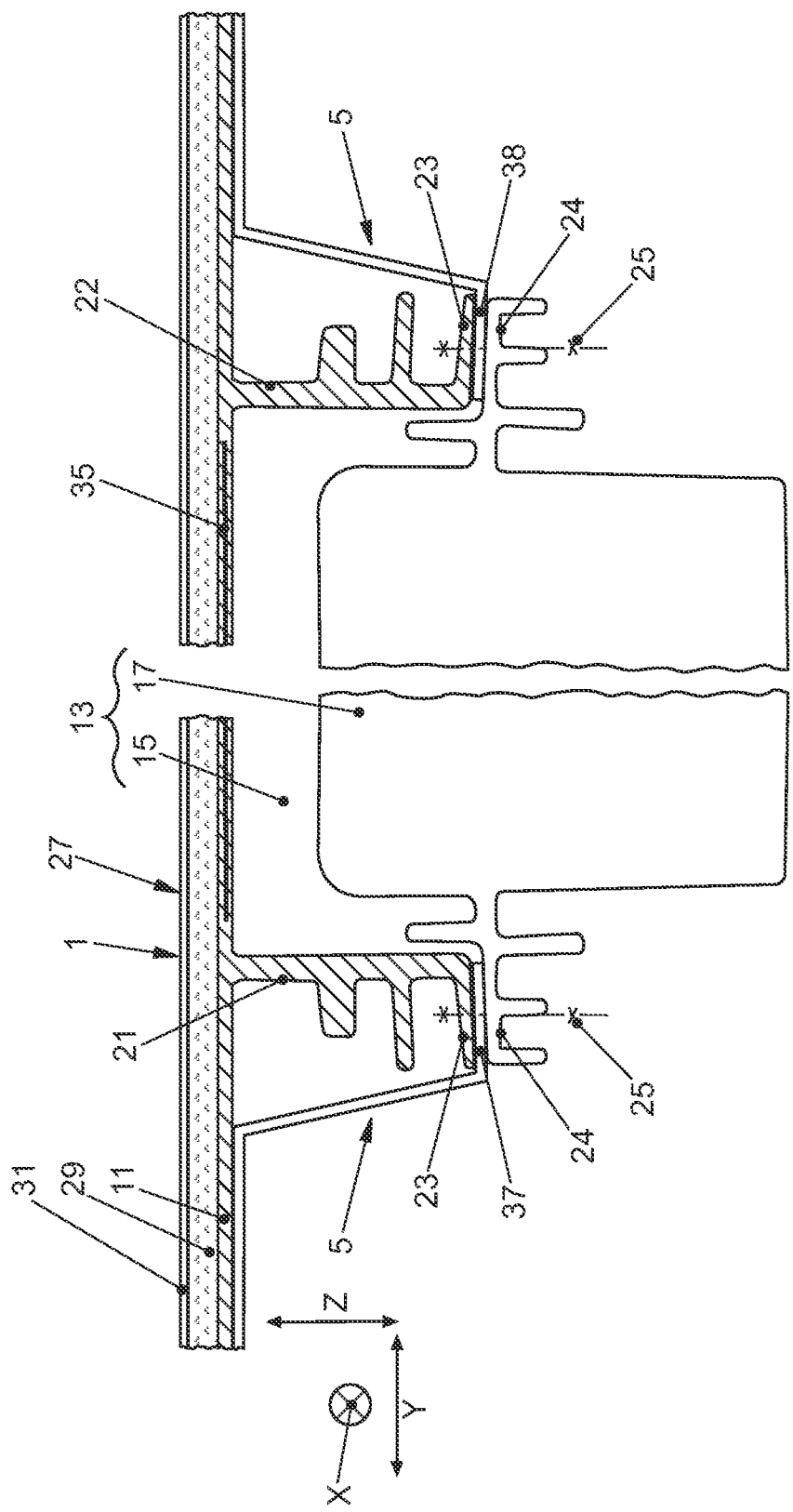
FIG. 3 illustrates a partial, cross-sectional view along the section plane II-II from FIG. 1.
Figure 4:
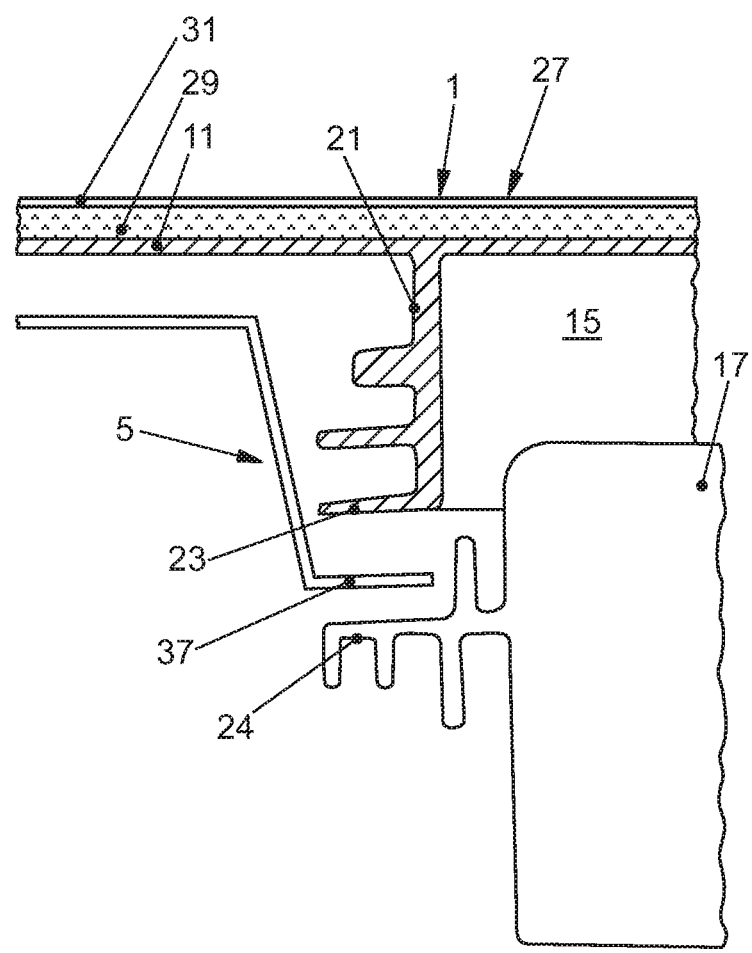
FIG. 4 illustrates the airbag module in exploded view and an indicated, basic body flange prior to assembly with the bottom side of the instrument panel upper part.

An airbag assembly 13 is provided on the passenger side of the instrument panel 1 which according to FIG. 2 is designed from a frame-shaped firing channel 15 formed at the bottom side of the instrument panel upper part 11 and an airbag module 17 mounted inside the firing channel 15. According to FIG. 2, the firing channel 15 is delimited in a frame-shaped manner by anterior and posterior firing channel walls 19, 20 and by lateral firing channel walls 21, 22 (FIG. 3). According to FIGS. 3 and 4, the airbag module 17 has laterally cantilevered housing flanges 24 (FIGS. 3 and 4) in the transverse direction of the vehicle y. In the assembly state, these are in a threaded connection 25 (FIGS. 3 and 4) with corresponding mounting legs 23. As shown by the crosses in FIG. 1, in each case two screw points 25 at each of the side walls 21, 22 of the firing channel 15 are provided which are spaced apart from each other in the longitudinal direction of the vehicle x. Approximately centered between the screw points 25 of each side wall 21, 22, in each case a basic body flange 37, 38 (FIG. 3) is clamped, as further described below.

The basic body 5 also has a retaining limb 10 (FIG. 2) which is threaded to a bearing console of the transverse mounting bar 3.

The firing channel 15 is closed at the airbag exit side by an airbag cover 27. When an airbag is activated, the airbag unfolds in firing direction and hits the bottom side of the airbag cover 27. As a result, the cover is torn from the instrument panel 1 and in a defined opening movement, folds around a hinge axis defined by the limiting strap 35 in the direction of the vehicle windshield indicated in FIG. 2.

In FIG. 2, the airbag cover 27 and the firing channel 15 with its channel walls 19 to 22 are integrally formed components of the same material of the instrument panel upper part 11. The present instrument panel upper part 11 is a foam carrier with a foam layer 29 arranged thereupon, and a decorative skin 31 on the visible side.

A material weakening 33 (FIG. 2) applied by laser machining which defines the airbag cover 27 extends directly inside the firing channel walls 19 to 22. In addition, a limiting strap 35 is injected in the instrument panel upper part 11, with a limiting strap section outside of the firing channel 15 and with a limiting strap section in the airbag cover 27 region.

As opposed to the other functional elements in the instrument panel, the airbag module 13 is comparatively weight-intensive and thus requires additional support on the transverse mounting bar 3 in order to prevent an unfolding upwards into the resonance range in normal driving mode. According to the invention, such support is not achieved by a fixing or support tab which directly supports the firing channel 17 on the transverse mounting bar 3. Instead, the basic body 5 has first, second and third supporting sections 36, 37 and 38 which support the weight force of the airbag assembly 13. According to FIG. 2, the first supporting section 36 is formed in the driving direction FR in front of the airbag module 17 in the basic body 5. The anterior firing channel wall 19 thereby comes into contact with the horizontal first supporting section 36 in a loose and vibration-free manner.

For the formation of a preferably wide support base, the two other supporting sections 37 and 38 (FIGS. 3 and 4) are also provided, viewed in each case laterally from the airbag module 17 in the longitudinal direction of the vehicle y. The two supporting sections 37, 38 are shown in FIG. 3. Accordingly, the second and third supporting section 37, 38 is in each case a horizontal basic body flange. At each of the side walls 21, 22 of the firing channel 15, in each case a basic body flange 37, 38 is clamped approximately centered between the screw points 25 of each side wall 21, 22.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An instrument panel for a vehicle, comprising:
   an instrument panel upper part;
   a frame basic body that is mountable on a transverse mounting bar of the vehicle, the frame basic body has receptacles for receiving functional elements and delimits at least one air channel of a vehicle ventilation system extending in a transverse direction of the vehicle along a windshield;
   an airbag assembly integrated on a passenger side of the instrument panel, which has a firing channel reaching to the instrument panel upper part and an airbag module mounted on firing channel walls, the airbag module having two housing flanges; and
   at least one supporting section provided on the frame basic body to which the firing channel walls are supported,
   wherein a first firing channel wall is adapted to be brought into contact with a first supporting section of the frame basic body in a loose and/or vibration free manner with a linear contact, and
   wherein a second and a third firing channel wall, at ends facing away from the instrument panel upper part, each merge into at least one outwardly angled mounting leg to which a respective one of the housing flanges of the airbag module is attached via a connection or a threaded connection.

2. The instrument panel according to claim 1, wherein a second and a third supporting section are each a basic body flange, wherein each of the basic body flanges are attached to a respective one of the firing channel wall mounting legs or are each clamped between a respective one of the firing channel wall mounting legs and a respective housing flange of the airbag module.

3. The instrument panel according to claim 2, wherein together, the first, second and third supporting sections form a support base for the firing channel wall.

4. The instrument panel according to claim 1, wherein the firing channel and an airbag cover covering the firing channel are integrally formed components of a same material of the instrument panel upper part.

5. The instrument panel according to claim 1, wherein the instrument panel upper part is a foam carrier, which forms a multilayer structure with a foam layer disposed thereupon and a decorative skin on a visible side.

6. The instrument panel according to claim 1, wherein the first firing channel wall is an anterior firing channel wall and wherein the first supporting section supports the anterior firing channel wall of the firing channel viewed in a longitudinal direction of the vehicle.

7. The instrument panel according to claim 6, wherein the second and the third firing channel walls are each lateral firing channel walls and wherein a second and a third supporting section each supports one of the lateral firing channel walls of the firing channel viewed in the transverse direction of the vehicle.

8. The instrument panel according to claim 1, wherein the at least one air channel of the vehicle ventilation system is a defrost channel.

9. The instrument panel according to claim 1, wherein the functional elements include a radio, a glove box, speedometer, and/or air vent.

10. The instrument panel according to claim 1, wherein a second and a third supporting section of the frame basic body are each a basic body flange, wherein each of the basic body flanges are clamped between a respective one of the firing channel wall mounting legs and a respective housing flange of the airbag module.

11. The instrument panel according to claim 1, wherein the frame basic body surrounds an exterior of the firing channel walls.

\* \* \* \* \*